United States Patent [19]
Calvert

[11] Patent Number: 5,354,092
[45] Date of Patent: Oct. 11, 1994

[54] TRACTION DEVICE FOR MOTOR VEHICLES

[76] Inventor: John Calvert, 43615 - 24th W., Lancaster, Calif. 93536

[21] Appl. No.: 52,256

[22] Filed: Apr. 23, 1993

[51] Int. Cl.⁵ ............................................. B60G 11/02
[52] U.S. Cl. .................................. 280/718; 280/721; 267/242; 267/271
[58] Field of Search ........................ 280/718, 720, 721; 267/229, 242, 260, 271; 180/345

[56] References Cited

U.S. PATENT DOCUMENTS

| | | | |
|---|---|---|---|
| 2,162,479 | 6/1939 | Flickinger | 267/271 |
| 3,388,762 | 6/1968 | Bausch | 280/718 |
| 3,499,660 | 3/1970 | Raidel | 280/720 |
| 4,098,523 | 7/1978 | Valerio | 280/718 |
| 4,175,772 | 11/1979 | Lampert | 280/718 |
| 4,282,945 | 8/1981 | Bessey | 180/345 |
| 4,633,564 | 1/1987 | Sauber | 280/718 X |
| 5,137,300 | 8/1992 | Walton | 280/720 X |

*Primary Examiner*—Margaret A. Focarino
*Assistant Examiner*—Christopher P. Ellis
*Attorney, Agent, or Firm*—Kelly, Bauersfeld & Lowry

[57] ABSTRACT

A traction device for a motor vehicle, includes a rear support assembly bolted adjacent to a leaf spring opposite to a rear axle, a front support assembly which is pivotally attached to a front end of the leaf spring, and a rigid link which extends between and is attached to both the front and rear support assemblies at locations spaced from the leaf spring. The front support assembly includes a pair of generally triangular plates wherein a bolt at each apex connecting the plates performs a defined function. Specifically, a first upper bolt extends through a front spring eye of the leaf spring to provide a pivot axis for the front support assembly. A second upper bolt is positioned to extend across an upper surface of the leaf spring at a location spaced rearwardly from the front spring eye, to limit pivotal movement of the front support assembly relative to the leaf spring. A third bolt extends between the plates at a lower end thereof to secure a front end of the rigid link. This rigid link includes an elongated link tube or bar having eye connectors threaded into the front and rear ends thereof. The eye connectors have opposite threads relative to one another such that rotation of the elongated bar about its longitudinal axis changes the overall length of the rigid link.

15 Claims, 2 Drawing Sheets

TRACTION DEVICE FOR MOTOR VEHICLES

BACKGROUND OF THE INVENTION

This invention relates generally to motor vehicle suspension systems. More specifically, the present invention relates to a traction device for limiting wrap-up of a leaf spring on acceleration of a motor vehicle.

Although there are many different types of suspension systems available for use in motor vehicles, the conventional leaf spring is most widely used. In rear-wheel drive vehicles, during acceleration the leaf spring is subject to twisting forces which are opposite in direction and magnitude to the acceleration of the drive wheels. This tends to cause some wrap-up of the rear wheel leaf springs and, under extreme acceleration conditions, often contributes to rear wheel "hop".

In an effort to minimize leaf spring wrap-up and rear wheel "hop" on acceleration, a number of devices have been designed. One of these is the simple bolt-on traction bar. Simple traction bars comprise a straight length of material, generally of steel, with a mounting pad attached to one end and a rubber "snubber" at the other. The mounting pad is attached to the point at which the rear axle meets the leaf spring assembly. The length of the bar extends forward from the mounting pad to a point under the front leaf spring eye. Under acceleration conditions, the counter-rotation of the rear axle is arrested when the snubber meets the spring eye.

Such bolt-on traction bars provide a number of advantages in that they decrease leaf spring wrap-up, tend to prevent rear wheel hop, and aid in improving rear wheel traction during acceleration. Additionally, these traction bars are typically relatively inexpensive and easy to install. They suffer a number of drawbacks, however, in that they have no effect on the instant center (the point at which the rear wheels push the vehicle), they only offer marginal improvement in traction, and they are only minimally adjustable.

Several other devices have been devised which represent improvements over the bolt-on traction bar. One such device is the ladder bar and another is the 4-link system. The ladder bar device comprises two mounting assemblies. One such mounting assembly is welded to the rear axle housing and the other is welded to the chassis. These mounting assemblies are interconnected by a tubing structure. The 4-link system, on the other hand, eliminates the conventional leaf spring from the motor vehicle. It utilizes two mounts, one of which is welded to the rear axle housing and the other being welded forward on the chassis. Tubular links connect the rear axle housing to the chassis.

Each of these improved devices prevents leaf spring wrap-up and rear wheel hop, greatly improves traction, and permits the instant center to be adjusted forwardly. There are, however, significant disadvantages associates with each of these systems which makes it less than ideal. Typically both the ladder bar and the 4-link system are more expensive than simple bolt-on traction bars. Additionally, professional installation is required.

Accordingly, there has been a need for a novel traction device for motor vehicles which is of durable yet simple construction, may be manufactured efficiently utilizing modern manufacturing techniques, and which provides many of the advantages of the prior ladder bars and 4-link systems in a bolt-on device. Such an improved traction device must be capable of preventing leaf spring wrap-up and rear wheel hop, as well as permitting the vehicle instant center to be moved forwardly. This would have the desirable effect of greatly improving traction during hard acceleration conditions. The present invention fulfills these needs and provides other related advantages.

SUMMARY OF THE INVENTION

The present invention resides in an improved traction device for motor vehicles which, when used in connection with a standard leaf spring, greatly improves the performance characteristics of the vehicle during rapid acceleration conditions. The traction device comprises a rear support assembly which is positioned proximate to a rear axle, and a front support assembly pivotally attached to a front end of the leaf spring. A rigid link extends between the rear support assembly and the front support assembly. In this regard, the front support assembly includes attachment means for connecting the rigid link to the front support assembly at a spaced location from the front end of the leaf spring.

In a preferred form of the invention, the rear support assembly includes a base plate which is bolted in place beneath the leaf spring opposite to the rear axle. A pair of rear mount brackets extend downwardly from the base plate to provide, at their lower ends, attachment means for connecting a rear end of the rigid link to the rear support assembly. The rigid link is bolted in place between the lower ends of the rear mount brackets.

The front support assembly advantageously includes means for limiting pivotal movement of the front support assembly relative to the front end of the leaf spring. The pivotal movement limiting means includes means for engaging an upper surface of the leaf spring in the form of a pivot stop which extends across the upper surface of the leaf spring.

The front support assembly further includes a pair of generally triangular pivot plates which are pivotally attached to the front end of the leaf spring and which support the pivot stop in a fixed spacial relationship to the front end of the leaf spring. The pivot plates further define the spaced location of the attachment means of the front support assembly, below the front end of the leaf spring. The pivot plates are secured to one another by three bolts positioned generally adjacent to the three apexes of the triangular plates. These bolts serve to provide a pivot axis for the front support assembly relative to the front end of the leaf spring, the pivot stop itself, and means for connecting a front end of the rigid link to the attachment means of the front support assembly.

The rigid link includes means for adjusting the length thereof. More particularly, the rigid link comprises an elongated bar having a front eye connector threaded into a front end thereof, and a rear eye connector threaded into a rear end thereof. The front and rear eye connectors are threaded oppositely into the elongated bar such that rotation of the elongated bar about its longitudinal axis changes the overall length of the rigid link.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 4 is an enlarged, fragmented sectional view taken generally along the line 4—4 of FIG. 1.

DETAILED DESCRIPTION OF THE PREFERRED EMBODIMENT

Figure 1:
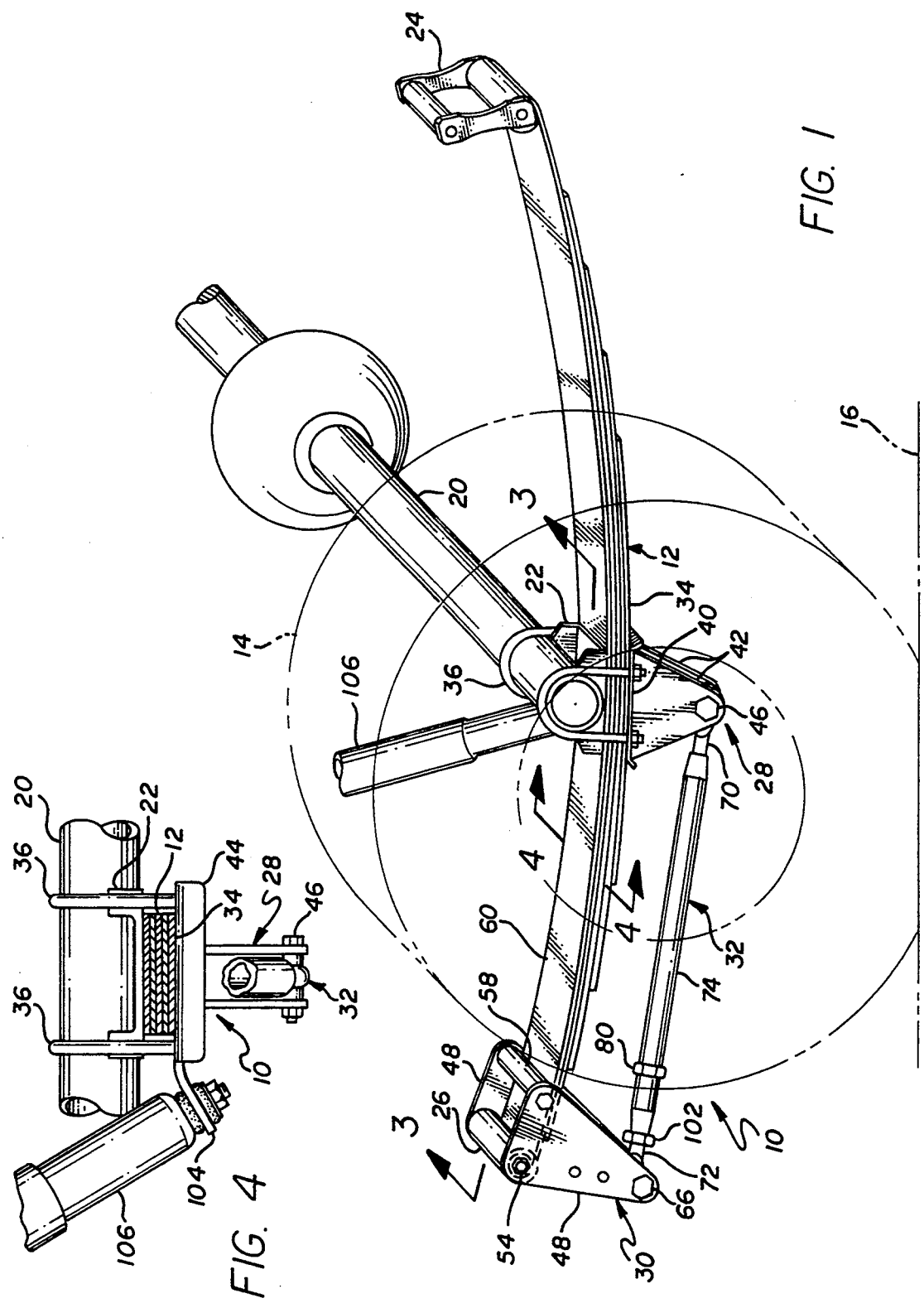
FIG. 1 is a perspective environmental view of a traction device embodying the invention, wherein the traction device is shown in place adjacent to a leaf spring supporting a rear axle of a motor vehicle.

As shown in the drawings for purposes of illustration, the present invention is concerned with an improved traction device for a motor vehicle, generally designated by the reference number 10. The improved traction device 10 works in conjunction with a standard leaf spring 12 to improve the performance characteristics of the motor vehicle during acceleration by preventing leaf spring "wrap-up" and rear wheel "hop", and by improving traction between the rear wheel 14 and the ground surface 16 by, in part, shifting the instant center 18 of the motor vehicle forwardly (see FIG. 2).

With reference initially to FIG. 1, a typical rear axle 20 is shown supported within a leaf spring axle bracket 22 centrally over a typical leaf spring 12. The rear axle 20 supports for rotation a wheel 14 (shown in phantom). The leaf spring 12 includes a rear leaf spring mount 24 which is supported by the motor vehicle chassis (not shown), and a front spring eye 26 which is also connectable to and supported by a portion of the motor vehicle chassis.

In accordance with the present invention, the traction device 10 comprises three primary components, namely a rear support assembly 28 positioned proximate to the rear axle 20, a front support assembly 30 which is pivotally attached to the front spring eye 26, and a rigid link 32 which extends between the front and rear support assemblies 30 and 28.

Figure 3:
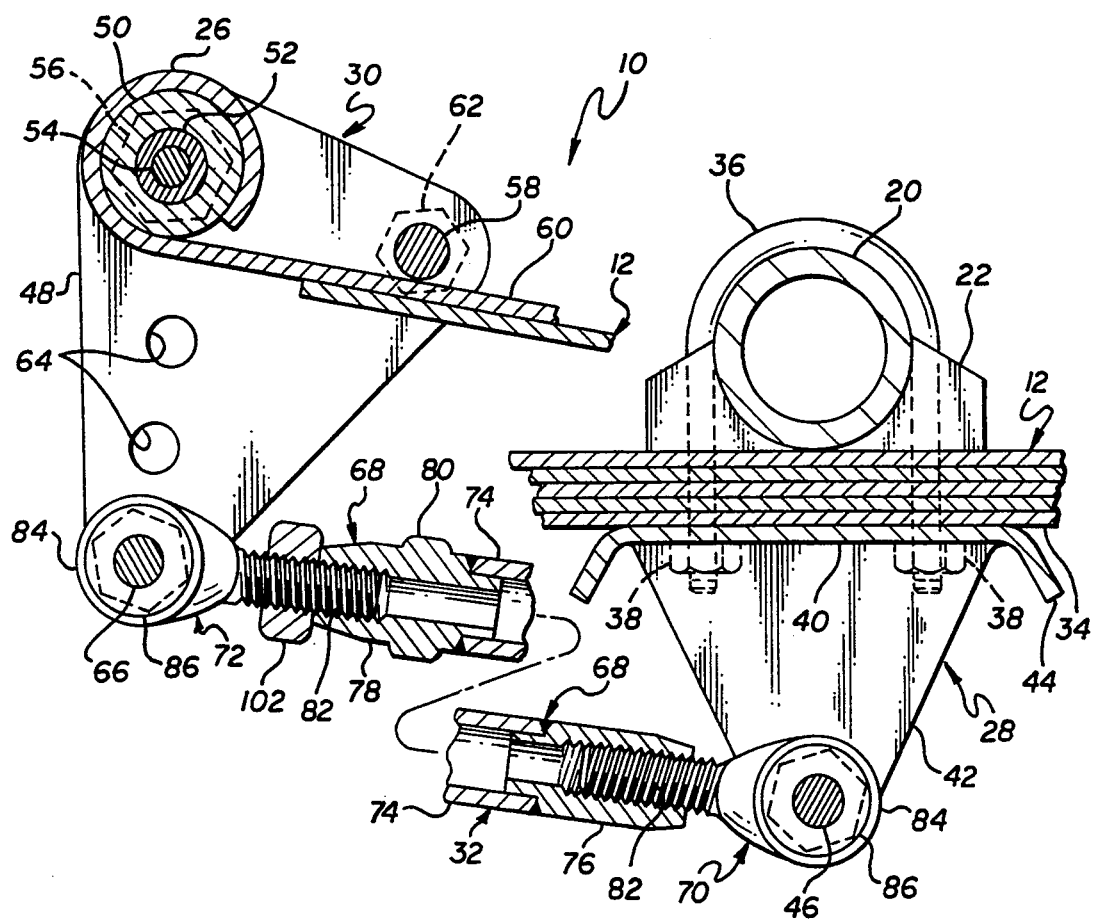
FIG. 3 is an enlarged, fragmented sectional view taken generally along the line 3—3 of FIG. 1.

As shown best in FIGS. 1, 3 and 4, the rear support assembly 28 is bolted directly adjacent to a lower surface 34 of the leaf spring 12 opposite to the rear axle 20 utilizing a pair of U-bolts 36 and nuts 38. The rear support assembly 28 includes a planar base plate 40 and a pair of parallel rear mount brackets 42 which extend downwardly from the base plate 40. The base plate 40 includes at least four apertures through which the U-bolts 36 extend, and front and rear flanges 44 at the forward and rearward edges of the base plate 40 which extend angularly downwardly away from the leaf spring lower surface 34. A fifth aperture (not shown) may be provided in the base plate 40 for the leaf spring bolt, if necessary. The rear mount brackets 42 are generally triangular in shape and include aligned apertures at their lower ends which receive a bolt 46 for securing a rear end of the rigid link 32 therein.

The front support assembly 30 includes a pair of identical, generally triangular pivot plates 48 which are spaced from one another at the front end of the leaf spring 12 and which include five apertures. A first one of these apertures is provided for pivotally positioning the front support assembly about the front spring eye 26. In this regard, a spring eye bushing 50 and a bushing insert 52 are provided which coaxially extend the width of the front spring eye 26, and a bolt 54 and nut 56 are utilized to secure the front end of the leaf spring 12 to the chassis and provide a pivot axis for the front support assembly 30. When properly arranged, the pivot plates 40 bracket the front end of the leaf spring 12 and position a pivot stop 58 adjacent to an upper surface 60 of the leaf spring 12 at a spaced location from the front spring eye 26.

The pivot stop 58 extends through a pair of the aligned apertures provided in the pivot plates 48 at one of the apexes thereof. The pivot stop 58 comprises a bolt which is secured within the aligned apertures by means of a nut 62. The pivot stop is useful in preventing wrap-up of the leaf spring 12 on acceleration of the motor vehicle.

It will be noted that the aligned apertures for the bolt 54 and pivot stop 58 are situated generally above the upper surface 60 of the leaf spring 12. Three additional pairs of apertures 64 are provided, however, in the pivot plates 48 which extend below the lower surface 34. These apertures 64 are utilized for selectively positioning a nut and bolt combination 66 which secures a front end of the rigid link 32 to the front support assembly.

The rigid link 32 comprises a rigid bar 68, a rear eye connector 70 which is threaded into a rear end of the rigid bar, and a front eye connector 72 which is likewise threaded into a front end of the rigid bar 68. The rigid bar 68 itself includes a heavy-duty cylindrical link tube 74 having an internally threaded rear insert 76 welded to a rear end thereof, and an oppositely internally threaded front insert 78 welded to a front end thereof. The rear insert 76 preferably includes a left hand thread, whereas the front insert 78 preferably has a right hand thread. The link tube 74 is also formed to include an external hexagonal fitting 80 to facilitate turning of the link tube 74 with a wrench.

The front and rear eye connectors 70 and 72 are identical to one another, with the exception that their threaded stubs 82 extending into the front and rear inserts 78 and 76, are threaded oppositely. More particularly, each of the front and rear eye connectors 72 and 70 include a threaded stub 82 which is threaded into the respective insert 76 or 78, and an outwardly extending eye piece 84. Each eye piece 84 is constructed to include a spherical race (not shown) which supports a rotatable bushing 86 therein. The bolts 54 and 66 extend through the eye pieces 84 and the rotatable bushings 86 to secure the eye connectors 70 and 72 to the rear and front support assemblies 28 and 30 in a standard fashion. Spacers are utilized to centrally position the front eye connector 72 between the selected aperture 64 of the pivot plates 48, so as to minimize any side to side movement of the front eye connector 72 along the nut 66.

Figure 2:
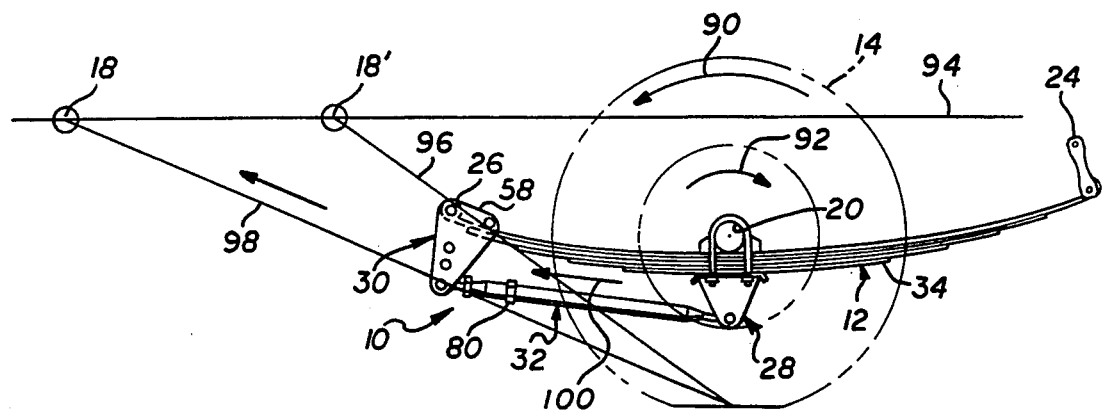
FIG. 2 is an elevational view of the traction device shown in FIG. 1, illustrating how the traction device moves the instant center of the motor vehicle forward in comparison with the instant center of the motor vehicle without the traction device of the present invention.

In use, the traction device 10 of the present invention effectively moves the instant center 18 forwardly relative to the length of the motor vehicle in comparison with the instant center 18' without the traction device 10. Referring to FIG. 2, a first arrow 90 indicates the direction of rotation of the rear wheel 14. The arrow 92 indicates the direction of force being applied to the leaf spring 12 during acceleration of the motor vehicle, which tends to cause leaf spring wrap-up. The line 94 indicates the vertical center of mass of the motor vehicle, and the line 96 illustrates where the instant center 18' would be located without use of the traction device 10. The instant center 18' is the intersection of the lines 94 and 96. The line 96 is taken from the center of contact between the ground surface 16 and rear wheel 14, through the front spring eye 26.

In contrast, the line 98 illustrates how the instant center 18 is shifted forwardly utilizing the traction device 10 in comparison with the instant center 18'. When utilizing the traction device 10 of the present invention, forces on the rear axle 20 and the center of the leaf spring 12 are transmitted forwardly as indicated by the arrow 100 through the rigid link 32 to the front support assembly 30. Forces thus applied tend to pivot the front support assembly 30 in a manner forcing the pivot stop 58 downwardly against the upper surface 60 of the leaf spring 12, thereby preventing leaf spring wrap-up. Because the forces are being transmitted through the rigid link 32 rather than directly through the leaf spring 12, the vector 98 which determines the instant center 18 is drawn from the center of the rear wheel 14 where it engages the ground surface 16, through the selected aperture 64 supporting the nut and bolt combination 66, thereby significantly moving the instant center 18 forwardly relative to the length of the motor vehicle. This advantageously improves the traction characteristics of the motor vehicle during acceleration.

It will be appreciated that any of the apertures 64 may be utilized for securing the front eye connector 72 between the pivot plates 48. The selection of different apertures 64 simply changes the angle of the vector 98, and allows the instant center 18 to be likewise adjusted.

The use of threaded eye connectors 70 and 72 with the rigid bar 68 permits the length of the rigid link 32 to be adjusted as needed. A lock nut 102 is provided adjacent to the front end of the rigid bar 68 to help prevent unnecessary and/or unwanted rotation of the rigid bar relative to the front and rear eye connectors 72 and 70 after being properly positioned.

During installation of the traction device 10, it is possible to pre-load either wheel 14 by initially adjusting the front support assembly 30 such that the pivot stop 58 bears downwardly on the upper surface 60 of the leaf spring 12 while the vehicle is stopped. By providing the threaded stubs 82 and the front and rear inserts 78 and 76 with opposite threads, the rigid link 32 can be connected to the front and rear support assemblies 28 and 30 and assembled by rotating the link tube 74.

From the foregoing it is to be appreciated that the traction device 10 may be easily installed on a wide number of motor vehicles to advantageously improve handling characteristics during hard acceleration of the motor vehicle. The basic configuration of the components described above may also be modified, for example, by adding components such as a shock mount 104 for a standard shock absorber 106. The traction device 10 may be installed in a simple bolt-on procedure which does not require welding or other modifications to the chassis or vehicle suspension system. The traction device 10 is relatively low in cost and yet prevents leaf spring wrap-up and rear wheel hop while greatly improving traction. It is adjustable to permit a user to select the location of the vehicle's instant center and may be utilized to pre-load either rear wheel 14.

Although a particular embodiment of the invention has been described in detail for purposes of illustration, various modifications may be made without departing from the spirit and scope of the invention. Accordingly, the invention is not to be limited, except as by the appended claims.

I claim:

1. A traction device for a motor vehicle, comprising:
a rear support assembly positioned proximate to a rear axle and an adjacent portion of a leaf spring;
a front support assembly pivotally attached to a front end of the leaf spring and including attachment means for interconnecting the rear support assembly and the front support assembly at a spaced location from the front end of the leaf spring, a pivot stop extending across the upper surface of the leaf spring, for engaging an upper surface of the leaf spring to limit pivotal movement of the front support assembly relative to the front end of the leaf spring, and a pair of facing plates pivotally attached to the front end of the leaf spring and which support the pivot stop in a fixed spacial relationship to the front end of the leaf spring; and
a rigid link extending between the rear support assembly and the attachment means of the front support assembly.

2. A traction device as set forth in claim 1, wherein the rear support assembly includes a base plate bolted in place adjacent to the leaf spring opposite to the rear axle.

3. A traction device as set forth in claim 2, wherein the rear support assembly includes a rear mount bracket which extends downwardly from the base plate, wherein the rear mount bracket provides, at its lower end, attachment means for connecting a rear end of the rigid link to the rear support assembly.

4. A traction device as set forth in claim 3, wherein the rear support assembly includes a pair of rear mount brackets, wherein the rear end of the rigid link is bolted in place between lower ends of the rear mount brackets.

5. A traction device as set forth in claim 1, wherein the pivot plates define the spaced location of the attachment means from the front end of the leaf spring, below the front end of the leaf spring.

6. A traction device as set forth in claim 1, wherein the rigid link includes means for adjusting the length thereof.

7. A traction device as set forth in claim 6, wherein the rigid link includes an elongated bar having a front eye connector threaded into a front end of the elongated bar, and a rear eye connector threaded into a rear end of the elongated bar.

8. A traction device as set forth in claim 7, wherein the front eye connector is bolted to the attachment means of the front support assembly, and wherein the rear eye connector is bolted to the rear support assembly.

9. A traction device as set forth in claim 7, wherein the front and rear eye connectors are threaded oppositely into the elongated bar such that rotation of the elongated bar about its longitudinal axis changes the overall length of the rigid link.

10. A traction device for limiting wrap-up of a leaf spring on acceleration of a motor vehicle, the traction device comprising:
a rear support assembly positioned proximate to a rear axle, including a base plate bolted in place adjacent to the leaf spring opposite to the rear axle, and a rear mount bracket extending downwardly from the base plate, the rear mount bracket providing, at its lower end, attachment means for connecting another member to the rear support assembly;

a front support assembly pivotally attached to a front end of the leaf spring, including means for limiting pivotal movement of the front support assembly relative to the front end of the leaf spring, and attachment means for interconnecting the rear support assembly and the front support assembly at a spaced location from the front end of the leaf spring, the pivotal movement limiting means including a pivot stop extending across the upper surface of the leaf spring, for engaging an upper surface of the leaf spring, the front support assembly further including a pair of facing plates pivotally attached to the front end of the leaf spring and which support the pivot stop in a fixed spacial relationship to the front end of the leaf spring; and a rigid link extending between the attachment means of the rear support assembly and the attachment means of the front support assembly.

11. A traction device as set forth in claim 10, wherein the rear support assembly includes a pair of rear mount brackets, wherein a rear end of the rigid link is bolted in place between lower ends of the rear mount brackets, and a mount for receiving a lower end of a shock absorber.

12. A traction device as set forth in claim 10, wherein the pivot plates define the spaced location of the attachment means from the front end of the leaf spring, below the front end of the leaf spring.

13. A traction device as set forth in claim 10, wherein the rigid link includes means for adjusting the length thereof.

14. A traction device as set forth in claim 13, wherein the rigid link includes an elongated bar having a front eye connector threaded into a front end of the elongated bar, and a rear eye connector threaded into a rear end of the elongated bar, the front eye connector is bolted to the attachment means of the front support assembly and the rear eye connector is bolted to the attachment means of the rear support assembly, and wherein the front and rear eye connectors are threaded oppositely into the elongated bar such that rotation of the elongated bar about its longitudinal axis changes the overall length of the rigid link.

15. A traction device for limiting wrap-up of a leaf spring on acceleration of a motor vehicle, comprising:

a rear support assembly positioned proximate to a rear axle, including a base plate bolted adjacent to the leaf spring opposite to the rear axle, and a pair of rear mount brackets extending downwardly from the base plate to provide, at their lower ends, attachment means for connecting another member to the rear support assembly;

a front support assembly pivotally attached to a front end of the leaf spring, including means for limiting pivotal movement of the front support assembly relative to the front end of the leaf spring, and attachment means for interconnecting the rear support assembly and the front support assembly at a spaced location from the front end of the leaf spring, the pivotal movement limiting means including means for engaging an upper surface of the leaf spring, the upper surface engaging means comprising a pivot stop extending across the upper surface of the leaf spring, wherein the front support assembly further includes a pair of facing pivot plates pivotally attached to the front end of the leaf spring and which support the pivot stop in a fixed spacial relationship to the front end of the leaf spring, the pivot plates further defining the spaced location of the attachment means of the front support assembly from the front end of the leaf spring, below the front end of the leaf spring; and a rigid link extending between the attachment means of the rear support assembly and the attachment means of the front support assembly, including an elongated bar having a front eye connector threaded into a front end of the elongated bar, and a rear eye connector threaded into a rear end of the elongated bar, wherein the front and rear eye connectors are threaded oppositely into the elongated bar such that rotation of the elongated bar about its longitudinal axis changes the overall length of the rigid link.

* * * * *